United States Patent
Min et al.

(10) Patent No.: US 11,602,671 B2
(45) Date of Patent: Mar. 14, 2023

(54) INTERACTIVE NETWORK GAME WITH GAME CONDITIONS ALTERED BASED UPON GROUP PHYSICAL ACTIVITY

(71) Applicant: Zwift, Inc., Long Beach, CA (US)

(72) Inventors: Eric Min, London (GB); Jordan Rapp, Thousand Oaks, CA (US)

(73) Assignee: Zwift, Inc., Long Beach, CA (US)

( * ) Notice: Subject to any disclaimer, the term of this patent is extended or adjusted under 35 U.S.C. 154(b) by 0 days.

(21) Appl. No.: 17/500,105

(22) Filed: Oct. 13, 2021

(65) Prior Publication Data

US 2022/0062709 A1    Mar. 3, 2022

Related U.S. Application Data

(63) Continuation of application No. 16/669,237, filed on Oct. 30, 2019, now Pat. No. 11,173,342.

(Continued)

(51) Int. Cl.
    *A63B 24/00*    (2006.01)
    *A63F 13/65*    (2014.01)
    (Continued)

(52) U.S. Cl.
    CPC ......... *A63B 24/0084* (2013.01); *A63F 13/65* (2014.09); *A63F 13/816* (2014.09); *H04L 67/131* (2022.05); *A63B 22/0076* (2013.01); *A63B 22/02* (2013.01); *A63B 22/0605* (2013.01); *A63B 71/0622* (2013.01);
(Continued)

(58) Field of Classification Search
CPC . A63B 24/0084; A63B 22/0076; A63B 22/02; A63B 22/0605; A63B 71/0622; A63B 2024/0068; A63B 2024/0096; A63B 2071/0644; A63B 2220/836;
(Continued)

(56) References Cited

U.S. PATENT DOCUMENTS 7,022,048 B1    4/2006  Fernandez et al.
7,857,731 B2  12/2010  Hickman et al.
(Continued)

OTHER PUBLICATIONS

"NetAthlon Version 2XF for Running/Skiing User Guide" RA Sports, LLC, 2010, Madison, Wisconsin. 35 pages.
(Continued)

*Primary Examiner* — Allen Chan
(74) *Attorney, Agent, or Firm* — SoCal IP Law Group LLP; Jonathan Pearce

(57) ABSTRACT

There is disclosed a system for conducting multi-member group competitions involving physical exertion, the system includes a competition server that serves to designate a set of parameters for a competition involving at least two competing groups of individuals engaged in physical activity, the set of parameters defining a win condition requiring physical activity to be completed by at least two separate individuals within each group. The system further receives data representative of physical activity of multiple individuals in a first group, receives data representative of physical activity of multiple individuals in a second group, determines whether the win condition has been satisfied by the first group or the second group, and identifies a winner as the first group or the second group that completed the win condition.

20 Claims, 8 Drawing Sheets

Related U.S. Application Data

(60) Provisional application No. 62/754,173, filed on Nov. 1, 2018.

(51) Int. Cl.
*A63F 13/816* (2014.01)
*H04L 67/131* (2022.01)
*A63B 22/06* (2006.01)
*A63B 22/02* (2006.01)
*A63B 22/00* (2006.01)
*A63B 71/06* (2006.01)

(52) U.S. Cl.
CPC .......... *A63B 2024/0068* (2013.01); *A63B 2024/0096* (2013.01); *A63B 2071/0644* (2013.01); *A63B 2220/836* (2013.01); *A63B 2225/20* (2013.01); *A63F 2300/69* (2013.01); *A63F 2300/8005* (2013.01)

(58) Field of Classification Search
CPC .... A63B 2225/20; A63F 13/65; A63F 13/816; A63F 2300/69; A63F 2300/8005; H04L 67/131
USPC .......................................................... 463/6
See application file for complete search history.

(56) References Cited

U.S. PATENT DOCUMENTS

| | | | |
|---|---|---|---|
| 9,087,234 B2 | 7/2015 | Hoffman | |
| 9,147,343 B2 | 9/2015 | Johnson | |
| 9,610,506 B2 | 4/2017 | Dugan | |
| 10,322,315 B2 | 6/2019 | Foley et al. | |
| 2009/0098980 A1 | 4/2009 | Waters | |
| 2012/0252580 A1 | 10/2012 | Dugan | |
| 2014/0038781 A1 | 2/2014 | Foley | |
| 2016/0144280 A1* | 5/2016 | Pawlowski | A63F 13/63 463/7 |

OTHER PUBLICATIONS

Fitness-Gaming.com "Gopher Sport Brings Interactive Fitness Games to Schools" https://www.fitness-gaming.com/news/schools/gopher-sport-brings-interactive-fitness-games-to-schools.html. (2019) 10 pages. Accessed Oct. 18, 2019.

Virtual Reality Fitness Software and on line Webracing, "Socially Interactive Virtual Reality Fitness," http://webracinginc.com/index.htm. Accessed Oct. 19, 2019. 1 page.

Virtual Reality Fitness Software and on line Webracing, "WebRacing," http://webracinginc.com/index.htm. Accessed Oct. 18, 2019. 3 pages.

Virtual Reality Fitness Software and on line Webracing, "NetAthlon," http://webracinginc.com/products_netathlon.htm. Accessed Oct. 18, 2019. 4 pages.

Virtual Reality Fitness Software and on line Webracing, Home Products "Web Racing is a great way for anyone to get fit and healthy—your kids will love it!" http://webracinginc.com/home.htm. Accessed Oct. 18, 2019. 2 pages.

\* cited by examiner

INTERACTIVE NETWORK GAME WITH GAME CONDITIONS ALTERED BASED UPON GROUP PHYSICAL ACTIVITY

RELATED APPLICATION INFORMATION

This patent is a continuation of U.S. patent application Ser. No. 16/669,237, filed Oct. 30, 2019 entitled "INTERACTIVE NETWORK GAME WITH GAME CONDITIONS ALTERED BASED UPON GROUP PHYSICAL ACTIVITY," which claims priority from U.S. provisional patent application No. 62/754,173 filed Nov. 1, 2018 also entitled "INTERACTIVE NETWORK GAME WITH GAME CONDITIONS ALTERED BASED UPON GROUP PHYSICAL ACTIVITY."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to competitive physical exercise using computers and, more particularly, to a system for integrating physical exertion from multiple game participants across an arbitrary number of teams to determine the outcome of a competition.

Description of the Related Art eSports (electronic sports) involve various computer and console-based games. Current favorites include DOTA® 2, League of Legends®, Counter Strike: Global Offensive®, Overwatch®, Starcraft II®, and Rocket League®. Many of these games involve team effort. Specifically, teams of players may coordinate activities or efforts to defeat another team. For example, in League of Legends, a team of five player avatars with different capabilities and characteristics attempts to defeat another team of five player avatars with still other capabilities and characteristics. These avatars are typically controlled by mouse and keyboard combinations or by some type of traditional video game controller (e.g. buttons and analog and digital joy sticks).

There also exist physical activity gamification systems. These systems may be relatively simple. For example, Strava® fitness trackers enable a social network where users can "race" one another to reach goals (e.g. 100 miles run or biked), certain speeds (e.g. a 5-minute mile), or certain cumulative goals (e.g. 200 miles run in a week or month). Typically, these types of gamification of physical activity happen asynchronously, meaning players are not racing or competing at the same time. Instead, Strava® fitness trackers collect physical activity data, and then share that data with a central server or among friend's devices. Comparisons may then be made between members of that group. The group need not even be "friends" per se. They may merely be competing on leaderboards selected automatically by the server or based upon user selections. Other fitness trackers provide communities like this as well. Similar communities exist for Fitbit® products and Nike Run® products.

Some more complex gamifications of physical activities enable real-time synchronous interaction between competing individuals through a virtual world or using a digital avatar controlled by a user exerting themselves. Some of the oldest of these types of interactions were enabled by dial-up modem networked cycle racing games which involved real racers competing in real-time while in different locations using a network. More recent examples of these types of gamifications may be seen, for example, in software like the Zwift® network. Zwift® software and servers enable groups of friends to exercise together, and, in general, to "race" against one another in real-time, using a computer network to connect people in various physical locations throughout the world. Zwift® also tracks progress or effort of a given user over time (e.g. a week of bicycle rides or running) so that comparisons between the efforts and effectiveness of those efforts may be tracked and compared among friends.

Live, real-time competitions of individuals racing one another can also be hosted within the Zwift® game. Typically, the competitors are physically present in the same physical location. This helps to ensure that no one is cheating and engenders more of an "event" feel to the race because it can be streamed or shown after-the-fact through video productions of the competition. These competitions may share data among riders or competitors' devices, such as cadence, wattage, speed, etc., so that the competitors may be informed as to the level of output that will be or is required to succeed in the race. Because the nature of Zwift® involves movement of avatars within a digital world, displays showing those racers as they move through the world can be shown both to the competitors and to any spectators for real-time viewing of the competition.

Despite the increase in sophistication of the gamification of combined physical and digital racing, the only real competitions have been either cumulative workout statistics (e.g. number of miles in a week) between friends or acquaintances or real-time races of all competitors against each other. Even products like Peloton® rely upon individual comparisons between individuals working out using their systems. Specifically, while participating in a class, other class participants can see how hard others in the class are working out and such effort may encourage each person in the group to increase their output accordingly. This is one of the benefits of a workout class in general, and it has been moved online in the Digital Age. Still, these comparisons remain one participant versus all other participants. They are only a variation on the single-player racing competition where everyone simultaneously competes against everyone else to be "the best" in a given race or class.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously described element having a reference designator with the same least significant digits.

DETAILED DESCRIPTION

Description of Apparatus

Figure 1:
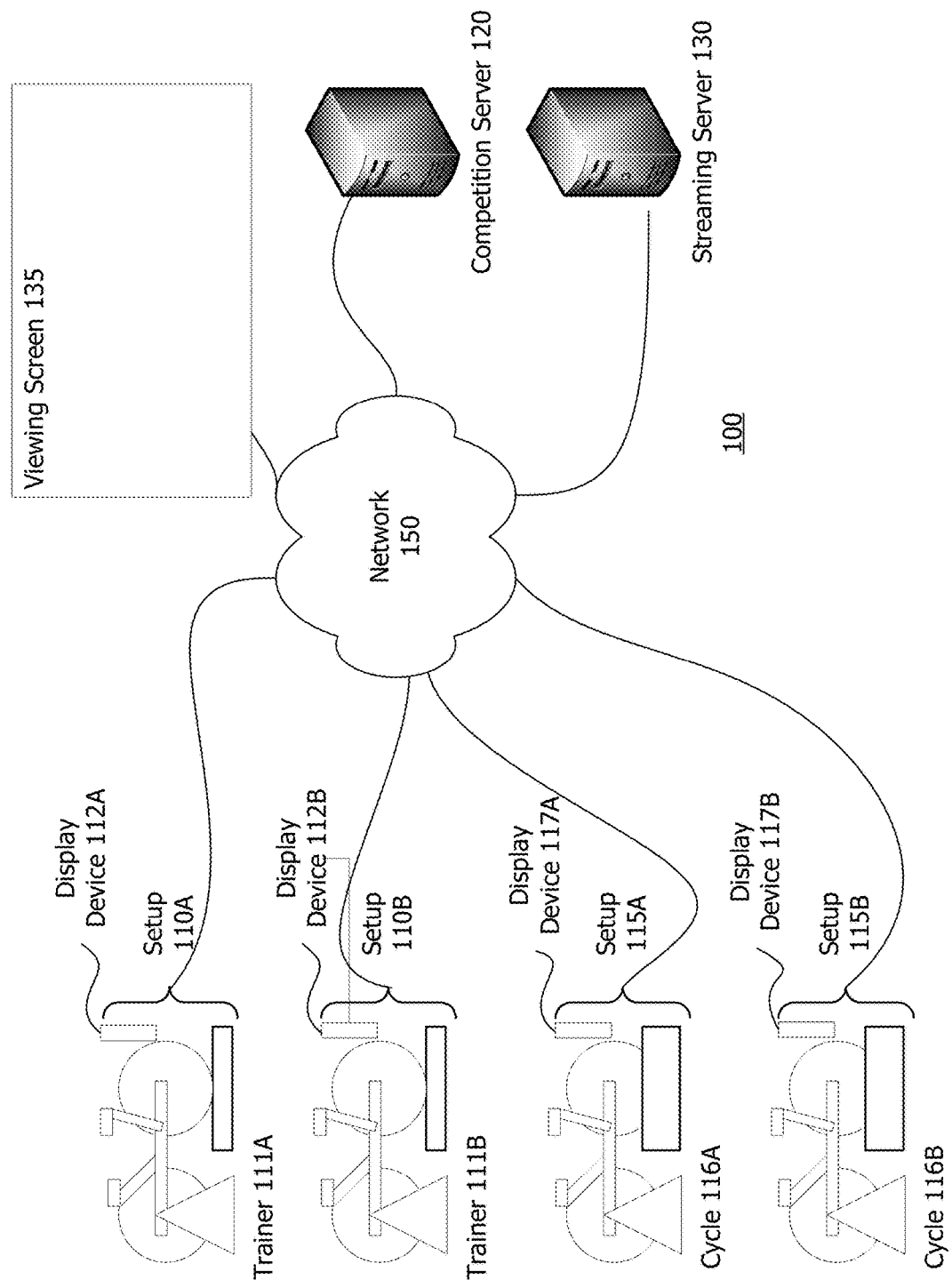
FIG. 1 is an overview of a system for multiplayer competitions involving group physical exercise.

Referring now to FIG. 1 an overview of a system 100 for multiplayer competitions involving group physical exercise is shown. The system 100 includes a series of setups 110A, 110B, 115A, 115B, a competition server 120, a streaming server 130, and a viewing screen 135 all interconnected by a network 150.

The setups 110A, 110B include at least a display device 112A, 112B, and a trainer 111A, 111B. For simplicity of discussion, we will refer only to setup 110A, but setup 110B is substantially identical. The trainer 111A is an electromagnetic, wind-resistance, or similarly based device that provides controlled resistance to a cycle or portion of a cycle that is connected to the trainer 111A for purposes of simulating lifelike resistance that occurs as a cyclist moves throughout the world. For example, if a cyclist in a virtual world or digital world is cycling "up" a virtual hill with a nine percent grade, then the resistance applied by the trainer 111A would be increased to simulate that nine percent grade. If that same cyclist is moving down a hill with a nine percent grade, then the trainer 111A may, in some cases, even apply forward rotational force to a wheel of the setup 110A to simulate a downhill movement aided by gravity.

As used herein, the phrases "digital world" or "digital environment" mean a three-dimensional world through which digital avatars can move through tracked physical movement or exertion by a competitor. Physical exertion or movement results in a change in location of the digital avatar within the digital world or environment. Generally, that movement is a one-to-one relationship with the exertion or movement that is tracked (e.g. for example, by a cycle trainer). However, as discussed more fully below, that relationship may be temporarily or permanently changed during a competition.

The "digital avatars" are three-dimensional representations of the player that appear in the digital world and that respond to the tracked physical exertion or movement by moving in response. Generally, digital avatars match the basic characteristics of the player (e.g. they appear on a bike, they are often the same gender as the player). However, a player may select any digital avatar desired. And, fanciful digital avatars (e.g. glowing bikes, unusual hair, flashy outfits) are often preferred merely for aesthetic reasons.

Trainers, like trainer 111A, are manufactured by various companies. Examples include the Wahoo® KICKR® and the Saris® H3®. There are numerous other examples of such trainers. The trainers may effectively replace a back wheel of a bicycle, including gears for use with a derailleur. In such cases, an axle of a bicycle frame is replaced with the trainer. Other trainers may apply their resistance directly to a wheel of a bicycle (e.g. by applying resistance to a tire). Many cyclists feel that the wheel-based trainers are less-realistic in their feel, but they are often less expensive because there are no gears, while the gears of the bicycle itself are retained. A rider may continue to use the bicycle more easily both inside, on the trainer, and outside when removed from the trainer.

The trainer 111A may be or include a computing device capable of communication with another external computing device. This may include communication with a display device 112A. In other cases, the trainer 111A may be fully integrated and include such a computing device capable of display, and of communication via network 150 with other devices, such as competition server 120.

The trainer 111A includes at least one type of physical exertion tracking. This may be as simple as a device that measures the speed of a turning wheel or flywheel on the cycle using, for example, a camera, magnetic, or infrared sensor. Based upon the size and speed of a given wheel or flywheel, other characteristics may be extrapolated, such as work and power. Heart rate sensors attached to a participant or to some portion of the cycle (e.g. the handlebars) or other device (e.g. oars of a rowing machine) may provide additional information that may be passed to the display device 112 for integration into the competition.

The trainer 111A is shown as a bicycle trainer, which replaces or applies resistance to the rear wheel of a bicycle. However, the trainer 111A may take other forms in the case of different types of exercise. In running, for example, a trainer 111A may merely be a treadmill, a speed tracker applied to a treadmill or may be or include a heart rate monitor or pace tracker on or in one or both shoes of a competitor. In rowing, the trainer 111A may be a rowing machine, or a device that tracks the speed and power of strokes from one or both sides of a fixed rowing machine. In swimming, the trainer 111A may be a device that tracks strokes for one or both arms. Though in the most common case, the trainer 111A may apply to cycles, it may take other forms depending on the context. In general, the trainer 111A tracks one or both of movement and power of some moveable aspect of a person or an exercise simulator (e.g. stationary cycle or stationary rower) and provides that information to an external computing device for analysis and comparison with others performance using similar trainers.

The setup 110A also includes a display device 112A. The display device's 112A primary function is to receive movement or power data from the trainer 111A, to pass that data to the competition server 120 using the network 150, and to show a digitally rendered world through which a digital avatar of the competition participant is moving based upon the movement or power data provided by the trainer 111A. The display device 112A is preferably both a display and a computing device that may receive the movement or power data from the trainer 111A and transmit it using network 150 to a competition server 120. An example of such a device is an Apple® iPad®. Though, many other devices are capable of performing the function of the display device 112A, including mobile phones, tablet computers, personal computers, desktop computers, laptop computers, purpose-made integrated displays and processing systems, streaming devices such as the Apple TV® when used in conjunction with a television display. Virtually any device capable of output to a display and of sufficient processing power to render a digital world may operate as the display device 112A.

In some cases, the functions of the display device 112A may be split among multiple devices. For example, a television display may operate as the display device 112A for showing the progress of a digital avatar in a digital world, while an external computer or processing device may operate to communicate with the trainer 111A and the competition server 120 using the network 150. In some other cases, devices capable of display may still merely be used for processing purposes with the display taking place elsewhere if one is available. For example, an iPad® may perform all processing functions, but the display may be transmitted to an external television or monitor using Apple® AirPlay® or a direct, physical connection.

Turning to setups 115A and 115B, they are also substantially similar to setups 110A and 110B. Only differences between 115A and 110A will be pointed out, with descriptions of other components not repeated here. The primary difference between 110A and 115A is that setup 115A relies upon an integrated cycle 116A. The cycle 116A may take the place of any trainer/bicycle combination in any part of the present disclosure. The cycle 116A is integrated in the sense that it includes at least one turning component that is linked to a resistance mechanism, but the cycle 116A may not be a bicycle that is otherwise designed for use outside or for riding while engaged in forward movement. Examples of such cycles as cycle 116A are stationary cycles having one or more wheels, but may also include systems that use no wheels whatsoever, with resistance applied directly or indirectly to a set of pedals by the cycle 116A.

The cycle 116A may be a so-called "smart" cycle that also generates motion and/or power data that may be transmitted to a competition server 120 via the network 150. The cycle 116A may be a traditional indoor cycle that has additional components added thereto so that use of the cycle 116A may generate motion and/or power data for transmission to the competition server 120. The cycles 116A, 116B may also incorporate a display device 117A, 117B, respectively, which are or include computing devices for enabling the transmission of motion and/or power data to the competition server 120.

Though the cycles 116A and 116B are both shown following trainer 111A and trainer 111B, the use of cycles and/or trainers may be mixed and matched in any given member of a competing group. Preferably, in serious competitions, the equipment will be standardized so as to avoid any irregularities or variances from equipment to equipment.

The competition server 120 is a computing device running software that enables it to receive and integrate motion and/or power data from multiple participants in a given competition. Though shown as a single computer, the competition server 120 may actually be many computers and some or all of its functionality may be split across multiple physical or logical computers in the same or various physical locations. In some cases, the competition server 120 may actually be one of the display devices, such as display device 112A. In that sense, the competitions may be run peer-to-peer, rather than through a centralized server.

The competition server 120 also maintains the overall status of the digital world in which any competition is taking place. This may be or include, for example, the locations of players within the digital world, the current speed of those players, the current cadence or power of those players, the direction those players are moving within the digital world, and any competition-based statistics or information such as the number of win conditions or parameters that have been satisfied. The competition server 120 makes the final determination whether, and when, a win condition has been satisfied for a given competition. The competition server 120 may also incorporate anti-cheating functionality to detect irregularities among the participants in an effort to avoid unfair competition.

As used herein, the term "win condition" is a set of parameters related to physical activity that define a state wherein one group is victorious over another group. The phrase "win condition" as used herein explicitly excludes situations of racing from a single starting line to a single finishing line by one or a group of riders. And, "win condition" explicitly races where the activity of a single individual determine a single victor or multiple racers crossing the same finish line determines a group victor. A "win condition" may incorporate a requirement that one or more digital avatars move to or through different digital locations within a digital world either in a prescribed time or before others (e.g. a capture the flag, or series of flags, scenario). Though only two teams are shown in FIG. 1, any number of teams, greater than one, may compete simultaneously. Multiple teams are required because all win conditions require physical movement or exertion by more than one team member.

The streaming server 130 is an optional component which may be integrated into the competition server 120 or may be maintained separately. The streaming server 130 is primarily responsible for enabling live or time-delayed video streaming of the competition as it takes place. The streaming server 130 may merely move automatically from participant to participant throughout the competition or may incorporate functionality to enable commentators or spectators to view or track particular participants as desired or as those participants near desired goals or win conditions. The streaming server 130 may integrate with streaming broadcast services such as Twitch.tv® or broadcasters to enable the view of the ongoing competition within the digital and physical world (the stream may also include shots of the physical exercisers on their trainers, cycles, treadmills, rowers, etc.).

The viewing screen 135 is also optional, but these competitions may be held in a single physical location using largely uniform components. As such, the event viewers or spectators, and even those participating, may wish to have an ongoing view of the competition that differs or focuses on the important aspects of the competition that may not be shown on the display devices (e.g. display device 112A) which focus on the individual participant. As such the viewing screen 135 may show other parts of the ongoing competition or may show the selected portions that are actively being streamed by the streaming server 130. In this way, the viewing screen 135 may provide an overarching view of the competition that enables spectators and participants to better understand the state of the competition as it is taking place.

Figure 2:
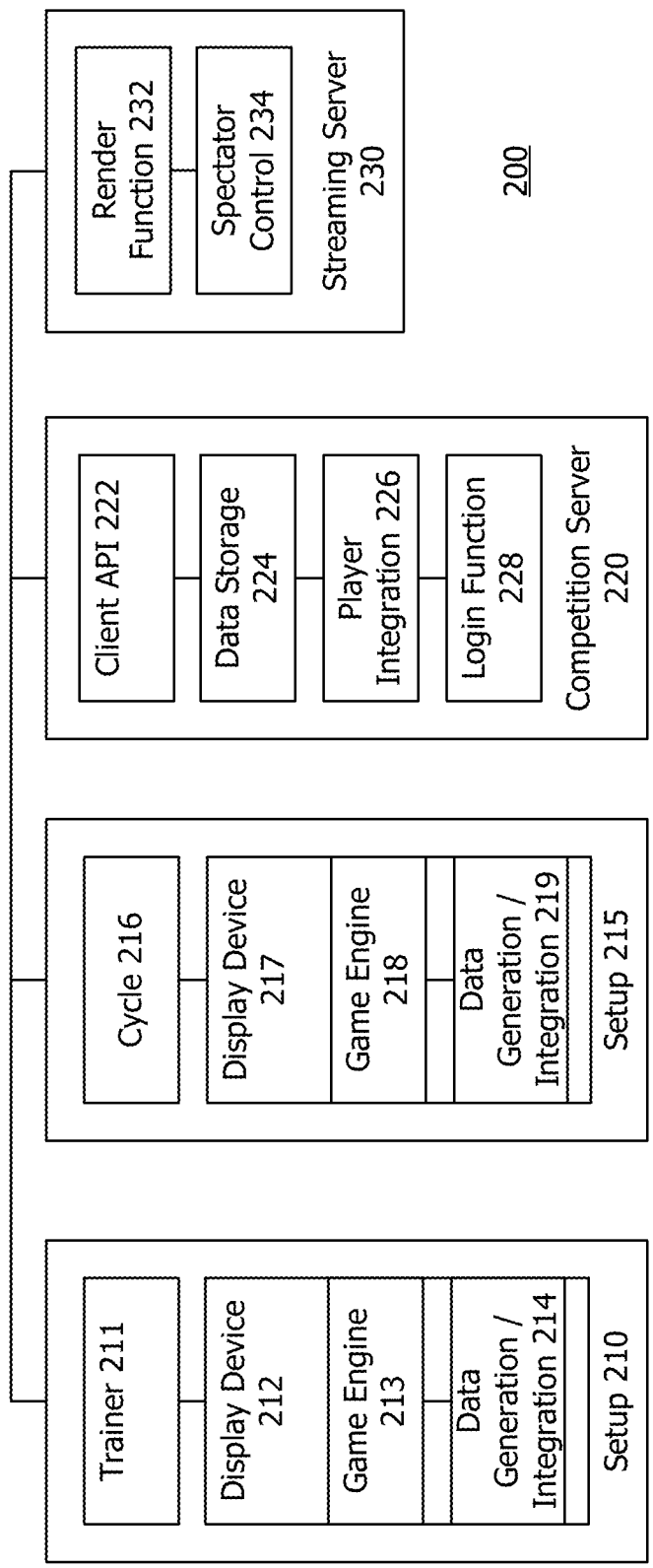
FIG. 2 is a functional diagram of a system for multiplayer competitions involving group physical exercise.

FIG. 2 is a functional diagram of a system 200 for multiplayer competitions involving group physical exercise. The system 200 includes a setup 210, a setup 215, a competition server 220 and a streaming server 230. This figure focuses on the functions of the various components and is simplified from FIG. 1, but otherwise corresponds to the components shown there.

Beginning with setup 210, which may correspond to setup 110A or 110B in FIG. 1, the setup 210 includes a trainer 211, a display device 212, which includes a game engine 213 and data generation/integration 214. The trainer 211 and display device 212 are discussed above with reference to FIG. 1. That discussion will not be repeated here.

However, it should also be noted that in some cases the display device 212 may be or include controls that enable a player or competitor to perform actions relative to the digital world through which a digital avatar is progressing. These actions may be as simple as steering a digital bicycle or player avatar. These actions may be more complex such as enabling vocal interaction between players using voice chat applications that may be a part of the game engine 213. These actions may include the selection and use of so-called "power ups" that provide boosts to in-game player characteristics such as speed, drafting capability, etc. The controls may also enable a player or competitor to select a competition in which to take part and to select options such as ending participation in the event.

These controls may be on-screen (e.g. a touchscreen of an iPad®) or may be an external controller as is common to video game consoles or a keyboard commonly used with personal computers. The controls may motion based (e.g. turning a device from side to side may result in turning within the game) or may be input based (e.g. a joystick). Furthermore, the controls may be split off to a separate device (e.g. a mobile phone with motion sensors) from the device actually showing the player within the digital world (e.g. a television or iPad®).

Furthermore, as shown herein, the display device 212 includes a game engine 213 and data generation/integration 214. The game engine 213 is computer software designed for the display of three-dimensional environments through which a player or competitor may traverse. Common modern game engines are Unity® and Unreal®. However, given the nature of the type of competitions disclosed herein, a fully or partially custom game engine may be used.

The game engine 213 may also include all of the art assets and three-dimensional models necessary to enable the competition to operate. These include textures and three-dimensional models for players' digital avatars, textures and three-dimensional models for the digital world through which the competition moves, audio files and the parameters of any game or competition itself (e.g. gravity, pathways through which competitors may move and those where they may not, timers, etc.). The game engine 213 may comprise multiple pieces of software, including an application responsible for providing the user interface and networking capabilities (e.g. to allow players to interact and communications with the game itself). And, the art assets and models may be stored separately, for example, in a dedicated data storage.

The data generation/integration 214 receives information about player movement and exertion on the physical exercise device (e.g. a trainer, treadmill, or rowing machine) and translates that information into movement of a digital avatar within the digital world. The data generation/integration 214 also transmits that motion and power data to the competition server 220 so that it may be integrated into the competition and, eventually, transmitted and displayed on the displays of other participants in the competition. For example, a burst of speed from a participant attempting to break away from the pack will be displayed not only on that participant's screen, but on the displays of others in the competition. In this way, the participants can compete with one another through visual cues typical in cycling or other physical competitions.

The data generation/integration 214 performs the inverse function of receiving data from other competitors via the competition server 220 and integrating that information into the game engine 213. For example, the digital avatars of those competitor's positions may be maintained by the competition server 220 and as new data comes into the setup 210 from the competition server, the data generation/integration 214 may update those player positions within the digital world. This data integration may also include statistics such as real-time and average speed, wattage, and other win conditions (e.g. a number of capture points captured cumulatively or individually by one competitor or both). This data may be represented on a display by the game engine 213. These updates may happen many times per second.

The cycle 216 is discussed above with reference to FIG. 1. The display device 217, the game engine 218, and data generation/integration 219 of setup 215 have similar functions to the corresponding components of setup 210. However, though a "trainer" and a "cycle" are shown here, the same general components are present in other device types such as rowing machines, treadmills, smart bikes, or other devices for physical activity and measurement of that physical activity.

The competition server 220 includes a client API 222, data storage 224, player integration 226, and a login function 228. The client API 222 is the system responsible for providing continual updates to the players regarding data necessary for the game engines 213, 218 to accurately represent the digital world. The client API 222 receives data from the data generation/integration 214, 219 and passes it to player integration 226, then transmits integrated data back to the data generation/integration 214, 219 to enable the game engines 213, 218 to generate an accurate game world. The client API 222 may also ensure that the data appears accurate and corresponds to valid input within the digital world (e.g. not out of bounds, not "inside" other aspects of the game, like trees or off-track, or other players).

Data storage 224 may store long-term and short-term data pertaining to the players and the game. For example, data storage 224 may store copies of all texture and model assets for a given game or competition. Data storage 224 may also store past races, past competitions, any power ups or cosmetic items (e.g. special textures for player characters or machine models like cycle textures), player characteristics such as weight, height, and past performance metrics (e.g. best times, past wins, etc.). This data, at least as it pertains to players or competitors, may be continually updated by the client API 222 as new data is generated by a player or competitor. As the digital world or in-game content is updated, the data storage 224 may likewise update its contents.

The player integration 226 receives data from all players or competition participants via the client API 222 and integrates it so that combined data may be passed back to each setup 210, 215 for display. In this way, updates to the positions and exertions of competitors may be reflected accurately in the digital world and within the game engines 213, 218 of each setup 210, 215. The player integration 226 system may involve the digital avatar's positions in the digital world, the digital avatar's speed, and acceleration, and output (e.g. watts). The player integration 226 may also involve the relative positions of the various players, such as a player immediately in front of another player in a cycle race may result in an "aerodynamic draft" effect that enables easier riding for the rider behind. That information may be generated and passed to the client API 222 for reporting to the game engines 213, 218 so that effect may reflected for the competitors. Likewise, any power ups obtained may be confirmed by the player integration 226 and the effect (e.g. increased speed) may be communicated to the game engines 213, 218 so that it is reflected within the digital world.

The login function 228 is shown separately, but may be a part of the client API 222. The login function 228 enables players or competitors to access the competition server 222 to view or participate in the competitions or the game. The login function 228 may check credentials such as login and password, or other, similar techniques, and enable access, for example, by providing an API key to the game engines 213, 218 following a successful login.

The streaming server 230 includes a render function 232 and spectator control 234. The render function 232 renders the game in much the same way as game engines 213, 218. The render function 232 may be modified in that it may not follow only a single player or competitor as the game engine 213 typically would. Instead, the render function 232 may allow for following multiple players, asynchronously or synchronously. It may enable flyovers or overhead views of groups of players, or split-screen views of players each engaged in various parts of a digital world in which the digital avatars are moving.

Spectator control 234 may enable real-time control over the views provided by the streaming server 230 such that a producer or director, for example, of a video stream of a competition, may select views to show to an audience. Spectator control 234 may also enable multiple simultaneous streams of the same competition such that a given spectator viewing on a streaming service can choose which stream to view from among several available. The spectator control 234 may simultaneously integrate live commentary (e.g. in-studio commentary by commentators) to be shown as one such stream to which the stream may "cut away" or which a given viewer may elect to view.

Figure 3:
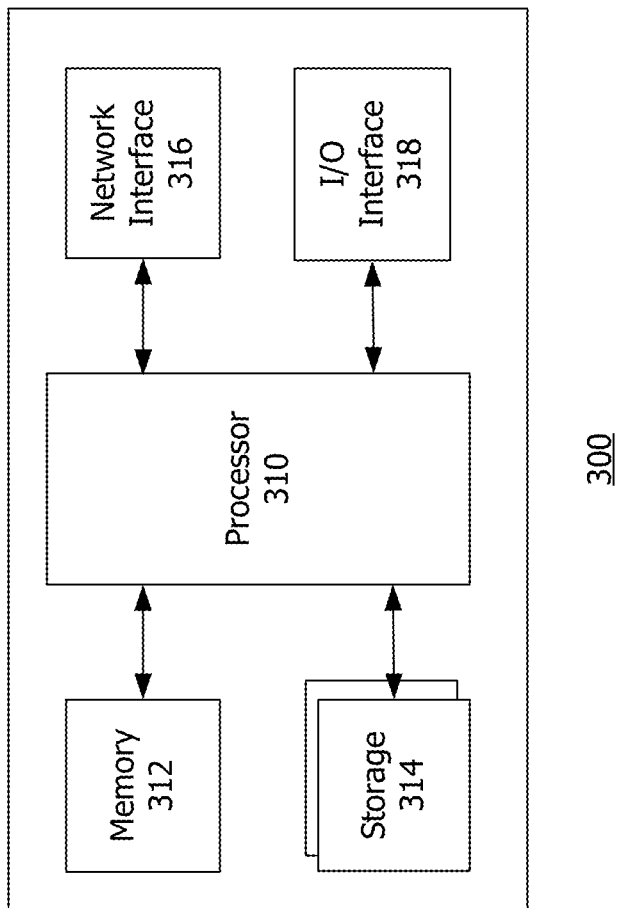
FIG. 3 is a functional diagram of a computing device.

Turning now to FIG. 3, a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 310 coupled to a memory 312, storage 314, a network interface 316 and an I/O interface 318. The processor 310 may be or include one or more microprocessors and application specific integrated circuits (ASICs).

The memory 312 may be or include RAM, ROM, DRAM, SRAM and MRAM, and may include firmware, such as static data or fixed instructions, BIOS, system functions, configuration data, and other routines used during the operation of the computing device 300 and processor 310. The memory 312 also provides a storage area for data and instructions associated with applications and data handled by the processor 310. As used herein, the word memory specifically excludes transitory medium such as signals and propagating waveforms.

The storage 314 may provide non-volatile, bulk or long-term storage of data or instructions in the computing device 300. The storage 314 may take the form of a disk, tape, CD, DVD, SSD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 316 is responsible for communications with external devices using wired and wireless connections reliant upon protocols such as 802.11x, Bluetooth®, Ethernet, satellite communications, and other protocols. The network interface 316 may be or include the internet.

The I/O interface 318 may be or include one or more busses or interfaces for communicating with computer peripherals such as mice, keyboards, cameras, displays, microphones, and the like.

Description of Processes

Figure 4:
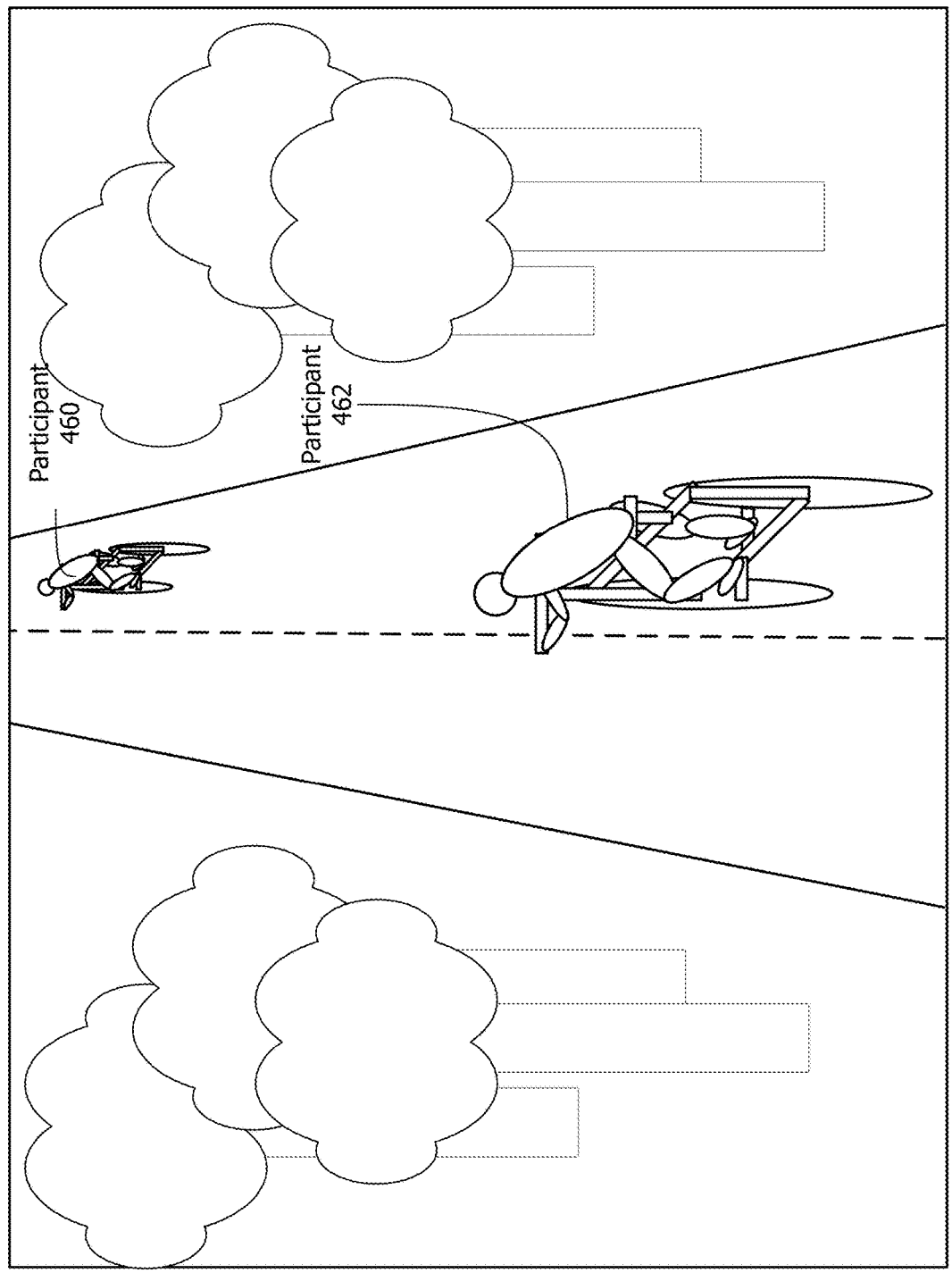
FIG. 4 is an example of a display screen showing two digital avatars of participants in a digital world.

Referring now to FIG. 4, an example of a display screen showing two digital avatars of participants in a digital world is shown. In this example, two participants 460, 462 are shown cycling through a digital world. The road is shown as a straight path, but may vary in both height and curve in different cases. The cyclist participant 462 is shown in third-person perspective, meaning that the user's digital avatar is visible on the display in full. In a first-person perspective, perhaps no digital avatar is visible on the display or perhaps only the handlebars are visible if the participant is a cyclist. In other cases, for example, rowing or racing on a treadmill, the participant may be shown in third person running directly on the road or path or rowing within a rowboat or shell with the vessel fully visible or merely the front of the vessel visible on the display. The participant 460 is shown at a certain distance in front of participant 462. The game engine may be designed in such a way that the human mind perceives the relative speed of the two participants 460, 462 and can roughly estimate the necessary acceleration to catch the participant 460, assuming other factors remain equal. In this way, the digital world will attempt to simulate the real world.

Figure 5:
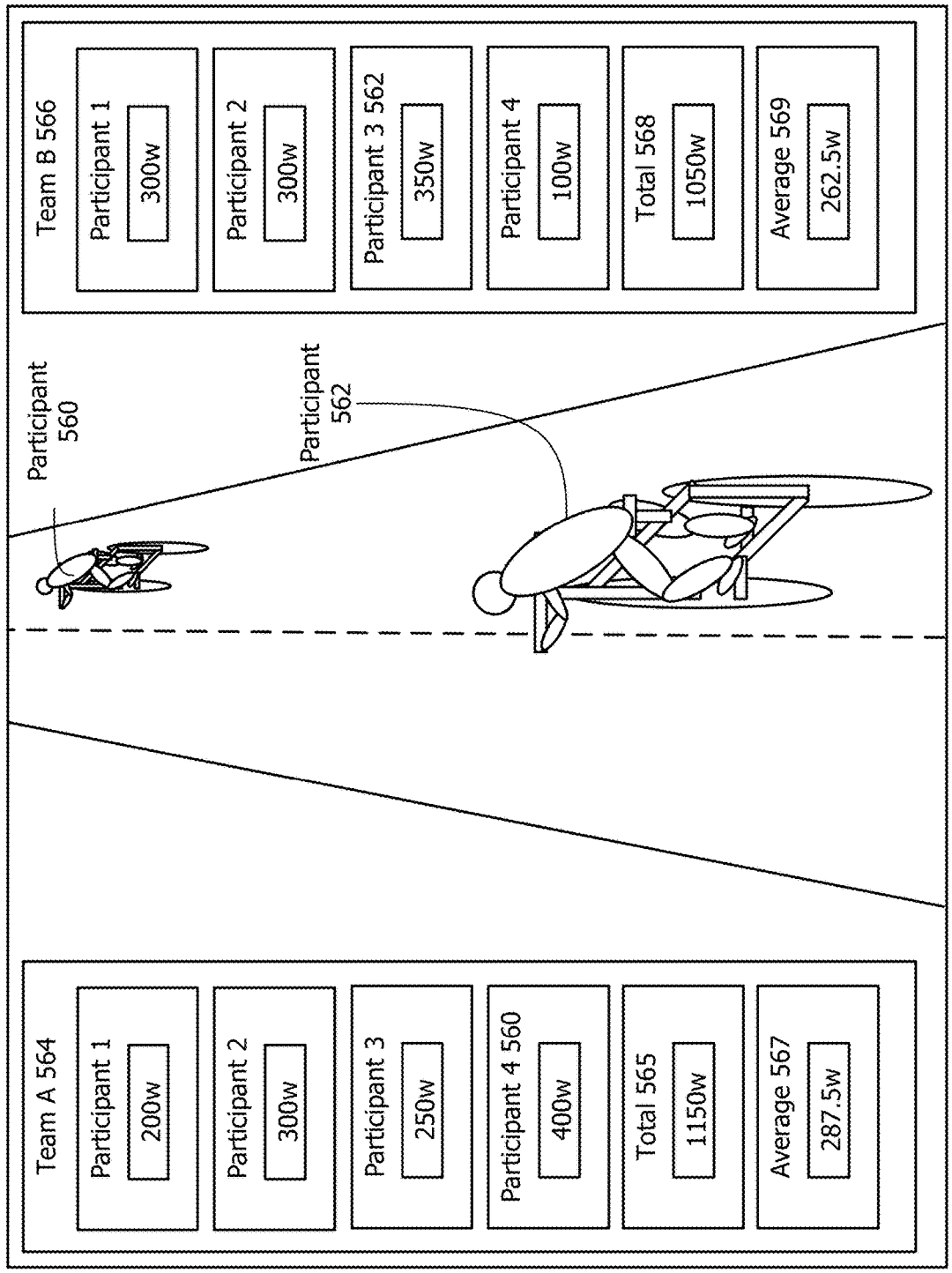
FIG. 5 is an example of a display screen showing cumulative and average statistics of a group of participants.

FIG. 5 is an example of a display screen showing cumulative and average statistics of a group of participants. This is a similar screen to FIG. 4, but the two participants 560, 562 now also have additional team-based data associated with them. Specifically, the display participant 4 560 is shown as generating 400 watts, while participant 3 562 is shown as generating 350 watts. This individual data may be gathered by each trainer or cycle (or other tracking device) and provided to the competition server. Then, group characteristics may be generated such as the totals 565 and 568, which are 1150 watts and 1050 watts, respectively. Similarly, averages may be taken such as average 567 which is 287.5 watts and average 569 which is 262.5 watts. As will be discussed more fully below, these statistics and characteristics may be used in whole or in part as parameters for a win condition for a group made up of multiple individuals simultaneously engaged in competition with another group of individuals.

These may be movement-to-moment statistics or may be overall averages that are maintained for the duration of a competition. In some cases, these statistics can be totals or averages, or totals or averages over a certain set of time or a certain distance or as each participant traverses some portion of a defined course or courses (e.g. two participants traverse a hill-climb section, while other participants traverse a long straightaway, while still other participants traverse a series of quick turns). In some cases, those competition portions may take place simultaneously, or the various portions may be staggered such that exciting portions of the competition are taking place simultaneously. For example, a long hill climb may begin first such that a short, straightaway sprint and the long hill climb may terminate substantially at the same time or in close proximity to one another.

Figure 8:
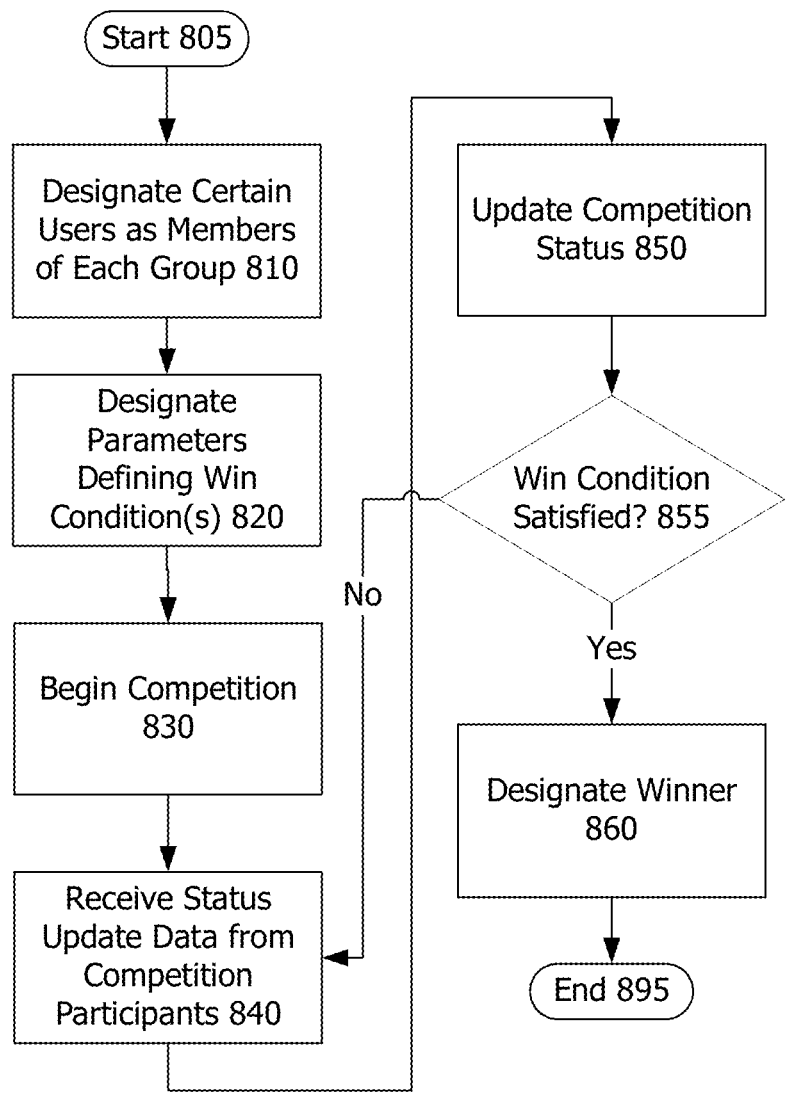
FIG. 8 is a flowchart of a process of conducting multiplayer competitions involving group physical exercise.

Turning now to FIG. 8, a flowchart of a process of conducting multiplayer competitions involving group physical exercise is shown. Given the example of FIG. 5, understanding the context of the group competitions may be helpful. FIG. 8 is a series of processes, primarily taking place on the competition server, that embody group competition as used herein. Multiple competitions may take place at the same time, and group participants may engage in multiple win conditions simultaneously. For example, there may be week-long competitions with daily competitions taking place along the way such that a win condition for one competition may have an effect on an overarching competition taking place and vice versa.

Following the start at 805, certain members of a competition are designated as members of each group at 810. At this stage, a number of individuals may login to the competition server and may identify themselves (e.g. through the use of a player account) to the competition server. These members may also permanently or semi-permanently be affiliated with a given team or group. Alternatively, the members may self-identify upon request as members of a given team or group. This information may be stored by the competition server, e.g. in data storage, and may be used to designate group membership for those users. Multiple groups may participate in a given competition. The number of groups may vary depending on the overall circumstance, for example, with only two teams competing in a "finals" competition, but with many teams simultaneously competing in a preliminary match or an impromptu "pick up" competition.

The teams may be composed of pre-selected or self-selected groups or teams. Alternatively, the teams may be generated in real-time by the competition server or other systems. In this way, competitors who may or may not routinely compete in these types of competitions may more easily transition into competition by being dynamically matched with players of similar (or complementary) physical skills. This may be so rigidly defined by the system that users are able to identify themselves as, for example, sprinters or hill climbers, so that they may specifically fulfill a role within a team. Similarly, statistics from prior competitions and other interaction with the software may enable the software to better match individuals in teams of similar skill levels. In this way, professional-level athletes are less likely to be matched with novice competitors. Such competitions are not typically fun for either competitor, being too easy for the professionals, and overwhelmingly hard for the novice. Facing some challenge is the most likely way to encourage ongoing participation in the competitions.

The competitions may be run at regular intervals or may be available at any time for matchmaking games through an application, like the Zwift® software. The best players may be identified by the software and associated win records and physical exertion statistics for competition in tournaments or finals matching the best competitors overall, or the best competitors in a particular class (e.g. men, women, certain age ranges, etc.).

Next, the parameters that define the win condition(s) are set at 820. These parameters may vary. In the example shown in FIG. 4, the parameters may simply be maintaining the highest total wattage for all members of a group over the course of a ten-minute competition. Alternatively, the parameters may be the highest total speed for all members of a group or the longest total distance for all members of a group. Likewise, averages of those parameters may also be used as parameters for win condition(s). For example, the highest average wattage, speed or average distance for all participants for a given team or group may define all or part of a win condition. The parameters that define a win condition may be multiple, such that a winning team must maintain the highest average speed and cover a certain distance over that time, for example. For runners, a cadence of a runner's gait may be used. For rowers, the cadence of each stroke may be used. Any parameter for each participant that may be measured may be used, in whole or in part, as a parameter defining a win condition. FIG. 4, above, is one example of such a scenario.

In another type of win condition, a group's collective wattage may increase a meter. Once the meter reaches a threshold, victory for that team may be declared. In more a complex scenario, the collective wattage (or average wattage) of a team may be compared to or subtracted from another team's wattage. This may be characterized as a type of a tug-of-war wherein the collective physical exercise, measured by physical sensors, is used to declare a winner by metaphorically "pulling" the other team into the mud through more physical effort. Speed may be used as averages, over distances, or collective. These types of competition may take place regardless of the type of physical exercise being used to generate data used to complete the win condition(s) for the competition.

The parameters defining win conditions can be much more complex. For example, king-of-the-hill competitions may take place using collective racing statistics (e.g. each player on a team competes in simultaneous races with another player from another team). Victories in each of those races (or merely being ahead for a certain amount of time) may result in that team being "king-of-the-hill" for that time period. At the end of a set time, the winner may be declared. The individual races may not be identical, meaning that certain racers may be better suited to certain types of races. The individual races may be weighted differently depending on type or characteristics of the race. For example, one competitor may be better at hill-climb bicycle or running areas. Likewise, another may be better at sprinting areas. The teams may, therefore, select competitors who are better at particular types of competition and then those competitions may be run together, and the results of those racers may be combined in some form. A sprint may finish relatively quickly, so it may start later so as to not have its outcome determined at the start. However, a sprint competition may be weighted heavily or co-equally with the hill-climb. The team's cumulative score or average score across all of the competitions (e.g. five segments) may be a parameter or parameter(s) (e.g. each segment of the overall components may be a parameter of an overall win condition to win more of the segments than the other team).

In situations in which different portions of the competition take place by different competitors on a team, the competitors may be automatically assigned to a particular portion or may take part in a "draft" whereby competitors are assigned to each as a part of the strategy of the competition. "Draft" processes allow the players on each team to self-select to some extent the role each will play. Some draft processes enable the opposing team to strike certain roles or competition types. For example, in a three-person competition, one team may fully strike any hill-climb segment of the competition, perhaps because their team lacks an excellent hill climber. In other draft types, one team may force a known excellent sprinter not to perform the sprint segment of a given competition using strikes during the draft process. Simultaneously, each team member may jockey and communicate to select which aspects of a given competition in which the participant wishes to take part. Various other game types may be envisioned. Some game-types may only be available for the physical exercise of running, or swimming, or rowing, or another specific physical exercise. Regardless of the physical exercise, the outcome or even game conditions (e.g. a virtual obstacle or benefit) may be controlled by the outcome of the physical exertion of multiple competitors acting in real-time.

Figure 6:
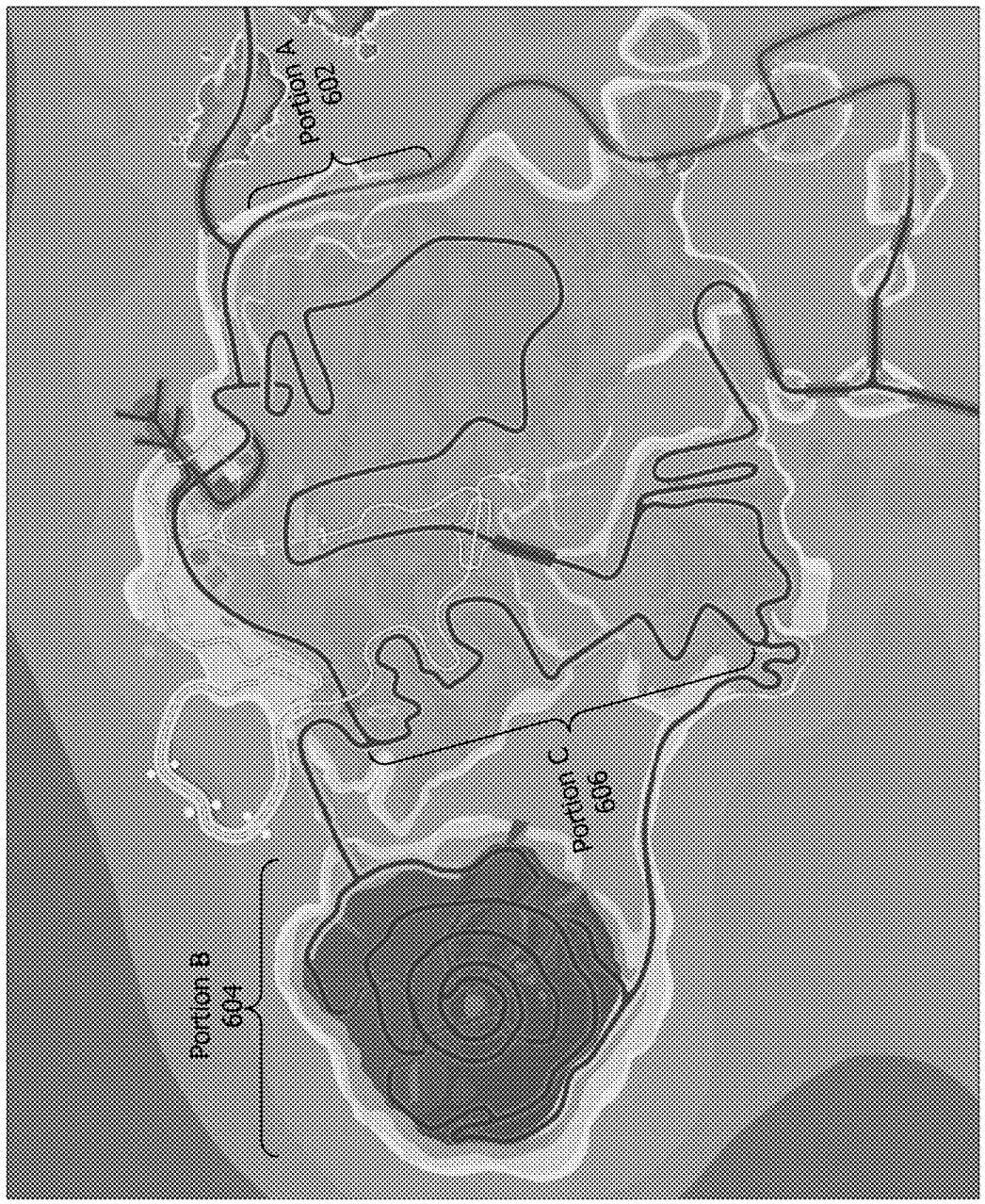
FIG. 6 is an example of an overhead view of an in-game map showing portions of the map that must be completed by individual participants of a group.

FIG. 6 shows an example of an overhead view of an in-game map showing portions of the map that must be completed by individual participants of a group. Portion A 602 is essentially a straight-away suitable for sprinting. Portion B is a difficult hill-climb section, traversing up a large volcano. Portion C is a curvy downhill (or uphill) ride. Different competitors for each group or team may compete in each portion. The overall winner may be the team that wins two of the three portions.

Yet another set of win conditions may involve two teams competing in a capture-the-flag or control point type game. There may be banners scattered about an in-game world. The team that captures the most banners during a set game time may be declared a winner. This may take place in a game space that may be traversed by cycling, running, rowing, etc. That process may be more than trivial as banners may be scattered widely enough that significant effort is required to move from banner to banner and there may be many banners scattered across a large map. There may be a set number of banners (e.g. a total of 60 such that capturing 31 ensures victory for a team, regardless of the time elapsed) or banners may continuously or dynamically "spawn" in places where no competitors are as each existing banner is captured.

As can be envisioned, the map may have different terrain types. For example, there may be hilly areas, and flat areas, large climbs to reach some banners, many small hills to reach others, or quick sprints for nearby banners. As such, strategy must be employed to select which of the team (e.g. of five or ten racers) should pursue which banner. Because the competition may be timed, that strategy must be quickly executed.

Figure 7:
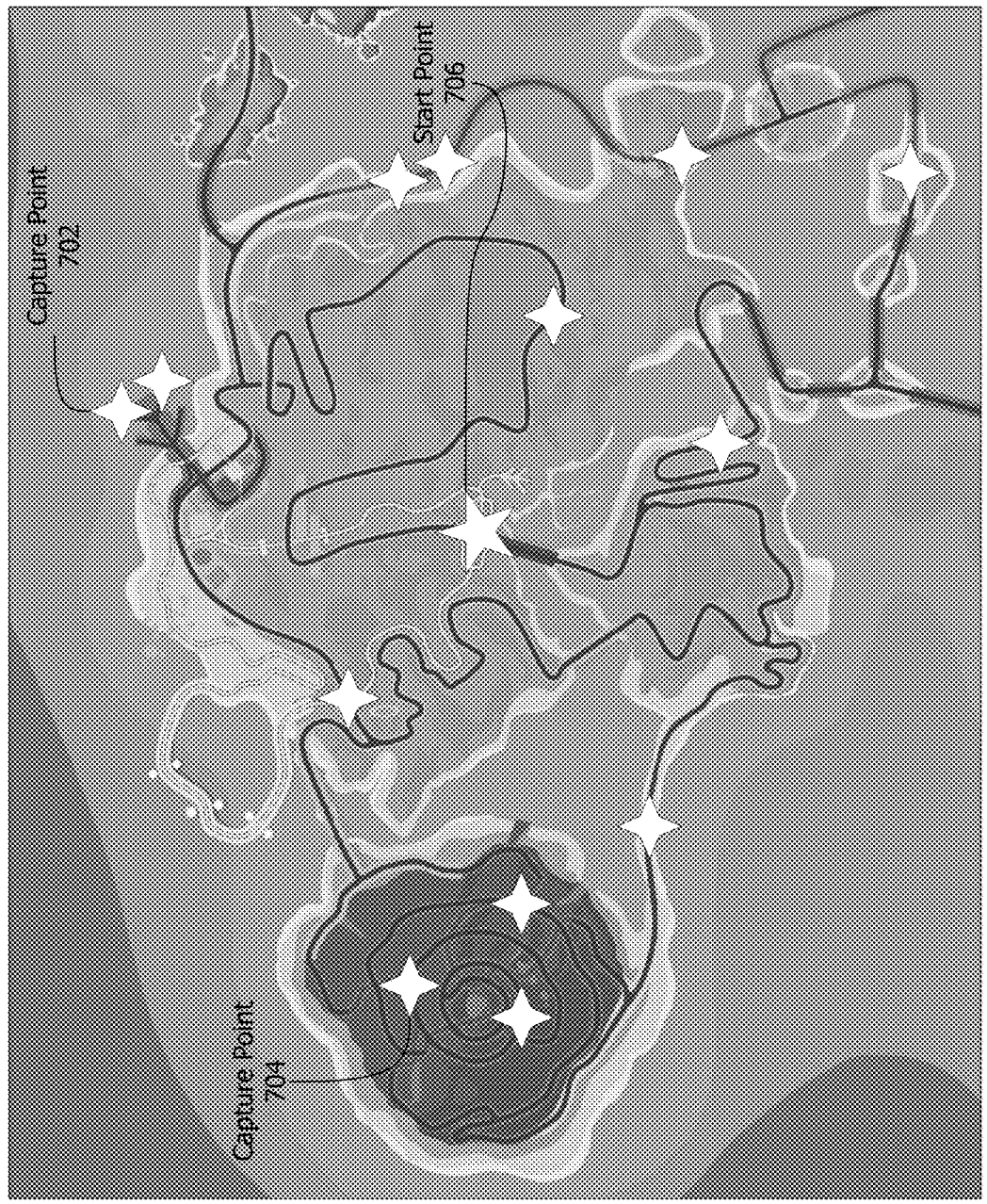
FIG. 7 is an example of an overhead view of an in-game map showing a starting position and capture points for capture by individual participants of a group.

FIG. 7 is an example of an overhead view of an in-game map showing a starting position and capture points for capture by individual participants of a group. Here, a number of capture points 702, 704, which may be, for example, banners or circles on the ground, are shown at various locations around the map. These capture points may be used in many different ways. For example, the capture points may be activated and "captured" by the first cyclist (or runner or rower, depending on the game type) to reach the capture points. A team may all start at the start point 706. As described above, the overall map has many different characteristics. There are straightaways and flat layouts, there are curvy and hill portions. There is even effectively a mountain-climb up a volcano (e.g. capture point 704). So, a given team must, after starting, quickly devise a strategy to collect the most capture points while maximizing utilization of its team members.

There are three capture points on the volcano near capture point 704. Different capture points may even be awarded different point totals. So, it may be very valuable to capture all three of those volcano capture points near capture point 704. If so, a team should select its best hill-climber to pursue those capture points. Similarly, capture point 702 is relatively far from the start point 706. A rider who is an able sprinter may reach those points fastest, or a rider with more endurance may be a better choice if the points are much further than a sprint would allow. These and other strategies may be employed, quickly, to enable a team to capture more points or a predetermined threshold of points, which may be the win condition or parameters in a win condition for this FIG. 7.

Alternatively, the capture points 702, 704 may be used in a "king of the hill" style game wherein a given team may capture a capture point, but that point may then be subject to re-capture by another team. The team with the longest time holding more capture points than the other team, or who holds particular capture points longest, or with the most captures or re-captures may be deemed the winner. A re-capture is a capture that follows capture by another team. Re-capture may or may not be available in a given competition. Any or many of those conditions may be the win condition(s) used in a given competition. So, in such an example, a team must strategize about the capture points least-likely to be re-captured or that are most-easily re-captured by their team following the capture by another. And, if re-capture is available, must attempt to maximize the capture points that remain captured by their team for the longest time during the competition.

Still further alternatively, the capture points 702, 704 may be used in a territory control style competition. In those cases, each capture point may represent a control point that exerts control over an area surrounding that capture point. In such a case, control over the most territory either for the longest total time during a timed competition or at the end of the competition, may be the win condition. If the first is the win condition, then re-capture may be possible to encourage teams to strategize about which control points, and resulting areas, to control. If the second is the win condition, then points may not be re-capturable to award teams who reach the most capture points fastest the victory. This may encourage small, individual "races" to certain capture points between teams or team members to ensure that particular capture points are their teams.

Still further alternatively, capture points may be captured according to certain characteristics. For example, an uncaptured capture point at the start of a match may be captured immediately, or by an individual's avatar "waiting" a short time on the capture point (e.g. 5 seconds). Or, in some cases, multiple team members may be required to capture a point (e.g. 2 or 3 team members). In other cases, the presence of the opposing team or an equal number of the opposing team on the capture point during the capture time may prevent capture. Again, this encourages racing to the capture point by some of the team members of both teams. And, then a strategic decision must be made whether to wait, foregoing the capture of other points on the map, or to move on quickly to the next capture point to ensure that it is captured, thus giving up on the contested capture point.

Still further by way of an example, if members of two teams are attempting to capture a point, then the presence of more of one team than another team may tip the scale such that a timer begins to countdown to capture by that team. Thus, nearby competitors may be prompted to move to the capture point, thus forgoing other capture points around the map, to ensure capture of a particular capture point. And, still others may speed to the rescue of their fewer-in-number teammates, if that is strategically sound.

Once a given capture point is captured, it may be re-captured by simply one member of the other team moving to that capture point. Or, in some cases, multiple team members of the opposing team may be required. Again, this encourages strategy whereby if two members are required to re-capture, but only one to capture, does a team forego the capture of additional, uncaptured capture points by bringing two team members to re-capture a capture point or does a team simply continue capturing uncaptured points.

To encourage competition, particular capture points may wield sway over others. For example, a large, central capture point may be required to maintain control over several subsidiary capture points. Thus, if that capture point falls, the others do as well. But, it may be gated behind a timer so that it cannot fall quickly. Or, the capture of several small capture points may feed into a larger capture point such that all of the several small capture points are required to be controlled before credit for the large capture point is available. In such an example, holding each small capture point may be worth only one point in a win condition, while the larger one may be worth five or ten points. Thus, again, introducing strategy to the team. The team must then choose between capturing other smaller points or defending the capture of the one larger point. And, the opposing team will be motivated to take away at least one of the smaller points because it may mean a significant difference in the associated win condition (e.g. gain the most points through control of the most capture points).

Notably, all of this requires physical exertion and effort on the part of each team member. Specifically, in contrast to other team-based games, moving one's avatar within the digital environment to a capture point or along a given portion of the map requires that the individual team member expend effort, tracked by a bicycle tracker, a digital bicycle, a treadmill, an electronic rowing machine, or similar device to cause a digital avatar associated with that competitor to move within that digital environment. And, as can be seen from the capture points of FIG. 7, the best strategies for winning do not involve entire teams moving their avatars to the same locations within the digital environment, but generally require team members to be accomplishing various goals within the digital environment at different locations within that digital environment. In almost no case would the best strategy be to ride in a group from one location to the next location, so this differs significantly from merely a "race" game.

At any point during the competition, so-called power-ups may appear. These power ups are generally unique from power ups in other games primarily in that they affect the digital results of physical exertion. Specifically, power ups may alter the effectiveness of a given rider cycling, or running, or rowing, or performing other physical activities on digital avatars within the game. Though, in most cases, the power ups require continued physical activity, the results of that activity may be altered.

The locations within the digital environment may be random or may be known to the competitors or may consistently appear at given intervals or in cases in which the competition is too one-sided to offer aid to a losing team. One example of a power up could be changing the relationship of the physical effort to movement of a competitor's digital avatar such that less physical movement or exertion is required to move a digital avatar within the digital world. Another power up could actually be a power down for the other team such that they are slowed, relative to their effort, for a time (e.g. 30 seconds). Another power up could automatically or randomly alter the capture state of a capture point, or take seconds off of an ongoing race. Other power ups may move a competitor closer to the end of a sprint or uphill climb, or closer to a capture point.

The various power ups may have visual effects on the game as well. For example, a speed increase power up may not actually appear to simply make the competitor move faster. Instead, the competitor may become larger, such that, by physics, his or her strides are larger (if running), or rotation of the bicycle's tires (if cycling) would result in larger distances being covered through the same effort. This is both entertaining to the recipient and for viewing on a display by a spectator, and provides visual cues within the competition to other participants, both on that competitor's team and on the opposing team, that the competitor has received a power-up. Likewise, "shrinking" the other team if they are slowed momentarily provides a similar, but inverse, effect.

Other power up effects are available, such as an "earthquake" effect that momentarily stops all movement of one or more players on a competing team. Other power ups may make certain capture points uncapturable for a certain duration, or may put up road blocks blocking access to certain areas for a duration. Other power ups may make capture of the next capture point instant, when it would normally require waiting capture for a short time. These, and many other power ups, are available to alter the game. Power ups may be more plentiful, according to a dynamic allocation, to teams who are projected to lose a given competition. Thus, the competitions may be brought into closer balance. In other cases, there may be no power ups available to any team to ensure that the competition is as evenly matched as possible.

Returning to FIG. 8, the parameters may be in some standard format, meaning that win conditions may be well-known for certain types of competitions over time. Regardless, win conditions are never an individual who finishes a race first. They are intentionally win conditions that require the physical exertion of multiple group member participants, preferably in different locations around a digital world. As the participants move through that world, the relative conditions change (e.g. certain areas are steeper, certain areas crowded, etc.).

After the parameters of the win condition(s) are defined, the competition may begin at 830. The start may begin, for example, with all competitors in a group at a central starting location. Alternatively, competitors may start remote from one another at various portions of a digital world or with various hazards or conditions before them.

From the start of the competition, the competition server may receive status update data from the competition participants at 840. This is shorthand for the trainers and/or display devices of each participant sending data from the setups to the competition server. This is so that the overall competition, and the status of the associated win conditions, may be tracked.

As that data is received from each competition participant, the status of the competition is updated at 850. This may include updating the "tug-of-war" meter to show that one team is winning the tug-of-war, or may be an update to the competitor statistics shown on the display in FIG. 4. This may be to show merely the displays of each competitor which serve to indicate their current position and the relative benefit they are providing or progress they are making toward the parameters defined for the win condition(s) at 820.

The competition will proceed until the determined win condition(s) are satisfied at 855. If they are not satisfied as of a status update at 850 ("no" at 855), then the competition will continue with additional status updates received from the competition participants at 840 and updates will continue being made to the competition status at 850.

If the win condition is satisfied ("yes" at 855), then the winning team will be designated at 860 and the competition will end. The statistics of the competition, and any associated members of each group, may be stored on the competition server for later matchmaking and for reference in future competitions.

The process may then end at 895.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. Apparatus comprising a non-volatile machine-readable medium storing a program having instructions which when executed by a processor will cause the processor to:
   designate a set of parameters for a competition involving at least two competing groups of individuals engaged in physical activity, the set of parameters defining a win condition requiring physical activity translated into movement of a digital avatar in two distinct locations within a digital world and requiring at least two different levels or types of physical exertion to be completed by at least two separate individuals within each group;
   receive data representative of physical activity of multiple individuals in a first group;
   receive data representative of physical activity of multiple individuals in a second group;
   determine whether the win condition has been satisfied by the first group or the second group; and
   identify a winner as the first group or the second group that completed the win condition.

2. The apparatus of claim 1 wherein the set of parameters includes movement of a digital avatar, via physical activity, for each of multiple members of the first group and the second group to at least two distinct locations within a digital world.

3. The apparatus of claim 2 wherein the set of parameters include a series of capture points placed within the digital world and movement by members of the first group and the second group to those capture points until a predetermined threshold of points are captured comprises the win condition.

4. The apparatus of claim 2 wherein the set of parameters includes at least partially simultaneous movement of digital avatars of at least two members of the first group and at least two members of the second group through distinct portions of a digital world through independent courses with different levels or types of physical exertion required to traverse each of the independent courses.

5. The apparatus of claim 1 wherein the set of parameters includes monitoring a measure of physical exertion for at least two members of the first group and at least two members of the second group simultaneously and the win condition includes identifying as the winner the group with a better collective measure of physical exertion.

6. The apparatus of claim 5 wherein the measure of physical exertion requires more than the speed of one or multiple members of the first group or one or multiple members of the second group traversing a course or crossing a finish line.

7. The apparatus of claim 6 wherein the win condition includes a cumulative total of the measure of physical exertion for the at least two members of the first group and the at least two members of the second group.

8. The apparatus of claim 1 further including a computing device comprising:
   the processor
   a memory
   wherein the processor and the memory comprise circuits and software for performing the instructions on the storage medium.

9. The apparatus of claim 8 wherein the data representative of physical activity for each member of the first group and each member of the second group is monitored by a monitoring computing device and transmitted via a network to the computing device.

10. The apparatus of claim 8 wherein the monitoring computing device is a selected one of a bicycle trainer, a wearable computing device, a stationary cycle, a mobile device, a treadmill, a rowing machine, a tablet computer, a streaming computing device, a laptop computer, and a personal computer.

11. A system for conducting a group competition involving physical exertion comprising a computing device configured to:
   designate a set of parameters for a competition involving at least two competing groups of individuals engaged in physical activity, the set of parameters defining a win condition requiring physical activity translated into movement of a digital avatar in two distinct locations within a digital world and requiring at least two different levels or types of physical exertion to be completed by at least two separate individuals within each group;
   receive data representative of physical activity of multiple individuals in a first group;
   receive data representative of physical activity of multiple individuals in a second group;
   determine whether the win condition has been satisfied by the first group or the second group; and
   identify a winner as the first group or the second group that completed the win condition.

12. The system of claim 11 wherein the set of parameters includes movement of a digital avatar, via physical activity, for multiple members of the first group and the second group to at least two distinct locations within a digital world.

13. The system of claim 12 wherein the set of parameters include a series of capture points placed within the digital world and movement by members of the first group and the second group to those capture points until a predetermined threshold of points are captured comprises the win condition.

14. The system of claim 12 wherein the set of parameters includes at least partially simultaneous movement of digital avatars of at least two members of the first group and at least two members of the second group through distinct portions of a digital world through independent courses with different levels or types of physical exertion required to traverse each of the independent courses.

15. The system of claim 11 wherein the set of parameters includes monitoring a measure of physical exertion for at least two members of the first group and at least two members of the second group simultaneously and the win condition includes identifying as the winner the group with a better collective measure of physical exertion.

16. The system of claim 15 wherein the measure of physical exertion requires more than the speed of one or multiple members of the first group or one or multiple members of the second group traversing a course or crossing a finish line.

17. The system of claim 16 wherein the win condition includes a cumulative total of the measure of physical exertion for at least two members of the first group and at least two members of the second group.

18. The system of claim 11 further comprising a set of at least four monitoring computing devices, at least one for each member of the first group and at least one for each member of the second group, wherein the data representative of physical activity for each member of the first group and each member of the second group is monitored by the monitoring computing device and transmitted via a network to the computing device.

19. The system of claim 18 wherein the monitoring computing device is a selected one of a bicycle trainer, a wearable computing device, a stationary cycle, a mobile device, a treadmill, a rowing machine, a tablet computer, a streaming computing device, a laptop computer, and a personal computer.

20. A method of using a network to conduct a group competition involving physical exertion comprising:
designating a set of parameters for a competition involving at least two competing groups of individuals engaged in physical activity, the set of parameters defining a win condition requiring physical activity translated into movement of a digital avatar in two distinct locations within a digital world and requiring at least two different levels or types of physical exertion to be completed by at least two separate individuals within each group;
receiving data representative of physical activity of multiple individuals in a first group;
receiving data representative of physical activity of multiple individuals in a second group;
determining whether the win condition has been satisfied by the first group or the second group; and
identifying a winner as the first group or the second group that completed the win condition.

* * * * *